United States Patent [19]
Szekely

[11] Patent Number: 5,388,867
[45] Date of Patent: Feb. 14, 1995

[54] HOSE

[76] Inventor: Daniel A. Szekely, 120 Bristol La., Irwin, Pa. 15642

[21] Appl. No.: 110,805

[22] Filed: Aug. 23, 1993

[51] Int. Cl.⁶ .......................... B65D 90/00; F26B 9/06
[52] U.S. Cl. .................................. 285/120; 220/23.2; 211/70.4; 285/238; 248/89
[58] Field of Search .................... 248/89; 211/70.4, 88, 211/87; 137/899, 355.16, 355.17, 355.18, 355.12; 206/443; 285/314, 316, 260, 120, 238, 363; 220/23.2, 23.83

[56] References Cited

U.S. PATENT DOCUMENTS

| | | | |
|---|---|---|---|
| 544,951 | 8/1895 | Bramble | 248/89 |
| 1,897,248 | 2/1933 | Ferguson | 248/75 |
| 2,709,624 | 5/1955 | MacChesney | 285/363 |
| 3,104,758 | 9/1963 | Allen | 220/23.2 |
| 3,339,747 | 9/1967 | Sherman | 211/70.4 |
| 3,616,941 | 11/1971 | Walling | 211/70.4 |
| 3,623,500 | 11/1971 | Hoy | 137/899 |
| 3,945,497 | 3/1976 | Greenberg | 211/70.4 |
| 4,135,596 | 1/1979 | Silba | 137/355.16 |
| 4,838,315 | 6/1989 | Gunn | 137/355.16 |
| 5,027,531 | 7/1991 | Wiens | 248/89 |
| 5,148,932 | 9/1992 | Orefile | 220/23.83 |

FOREIGN PATENT DOCUMENTS 838248 5/1952 Germany ............................. 248/89

Primary Examiner—Eric K. Nicholson
Attorney, Agent, or Firm—Hymen Diamond

[57] ABSTRACT

For convenience in storing and handling, a garden hose of substantial length is formed of a plurality of sections which can be readily stored and readily assembled into a hose of substantial length. Each section has a female coupler at one end and a male coupler at the opposite end. Most of the couplers in the chain of hose sections are threadless, quick-connect coupler units with a male coupler that clicks into a female coupler. The sections are so short as not to require winding into a coil and so long that only a small number of sections are required to form the hose of substantial length. There are unfolded shorter tube sections and longer sections folded into a U-shape. In use, the female coupler of an end section is connected to the male coupler of a water source and the male coupler of this end section and of each of the other sections is connected to the female coupler of a contiguous section, the male coupler of the section at the opposite end being connected to the female coupler of a nozzle or any water-driven appliance. There is also a container assembly for storing the hose sections including a plurality of hose-section tubes, each for holding a hose section and a cylinder to the inner surface of which the hose-section tubes are secured to form a rigid unit.

9 Claims, 4 Drawing Sheets

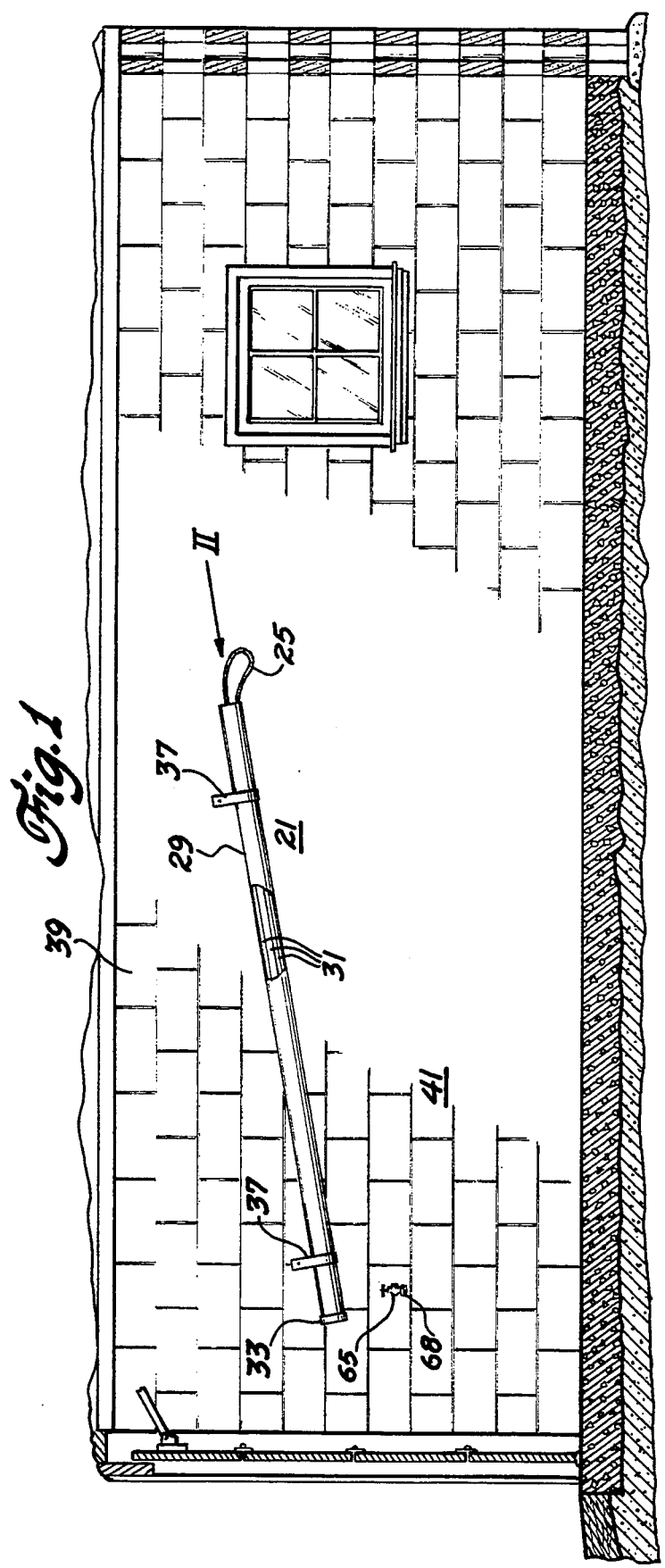
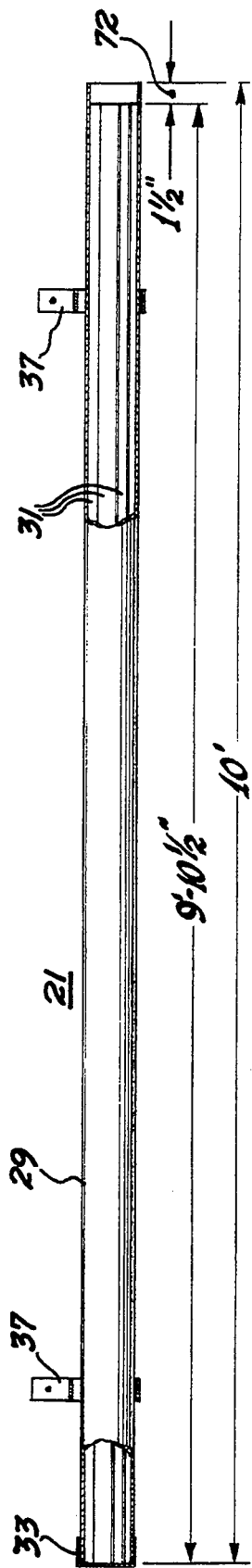

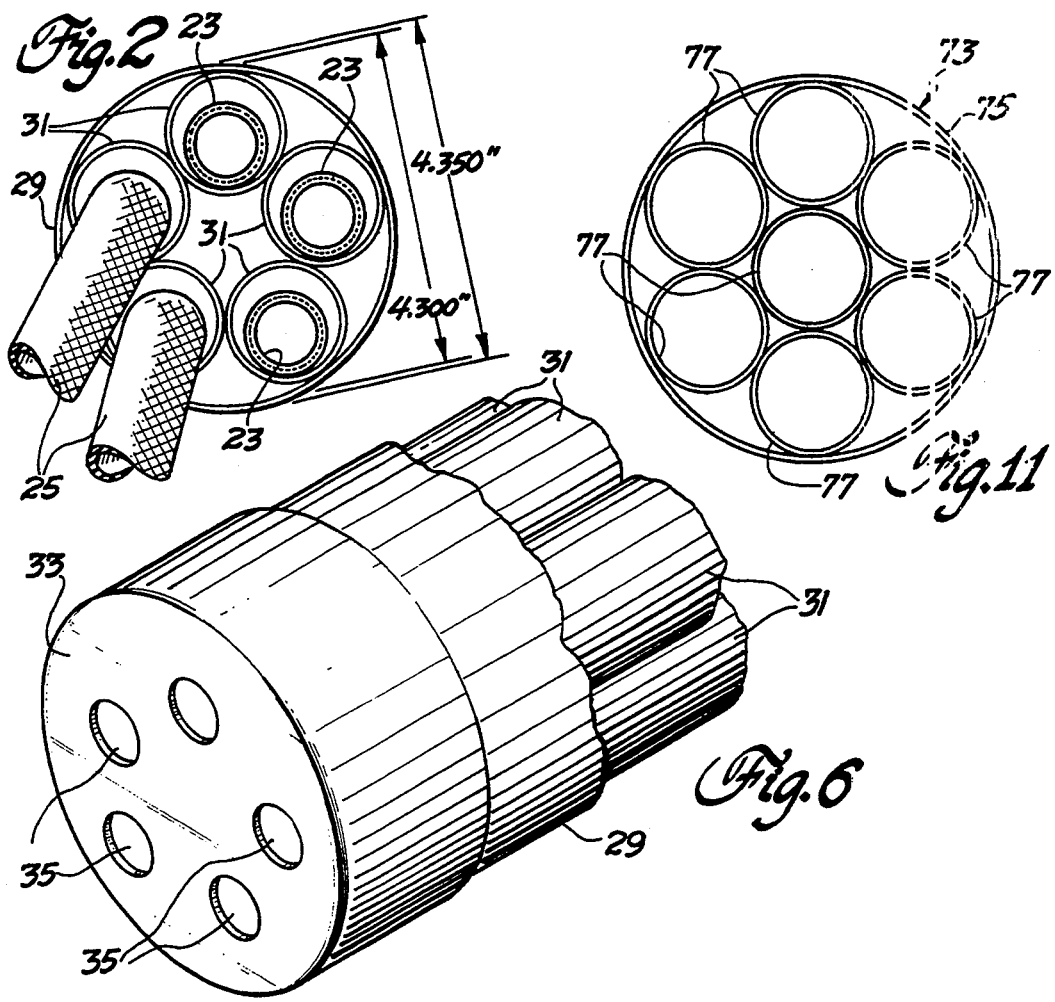
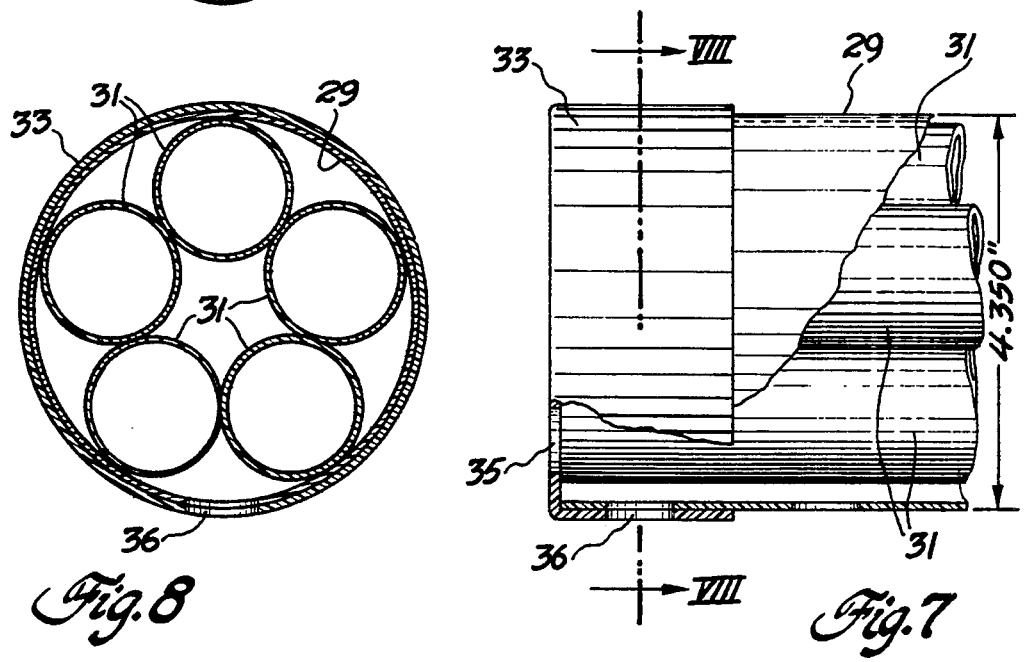

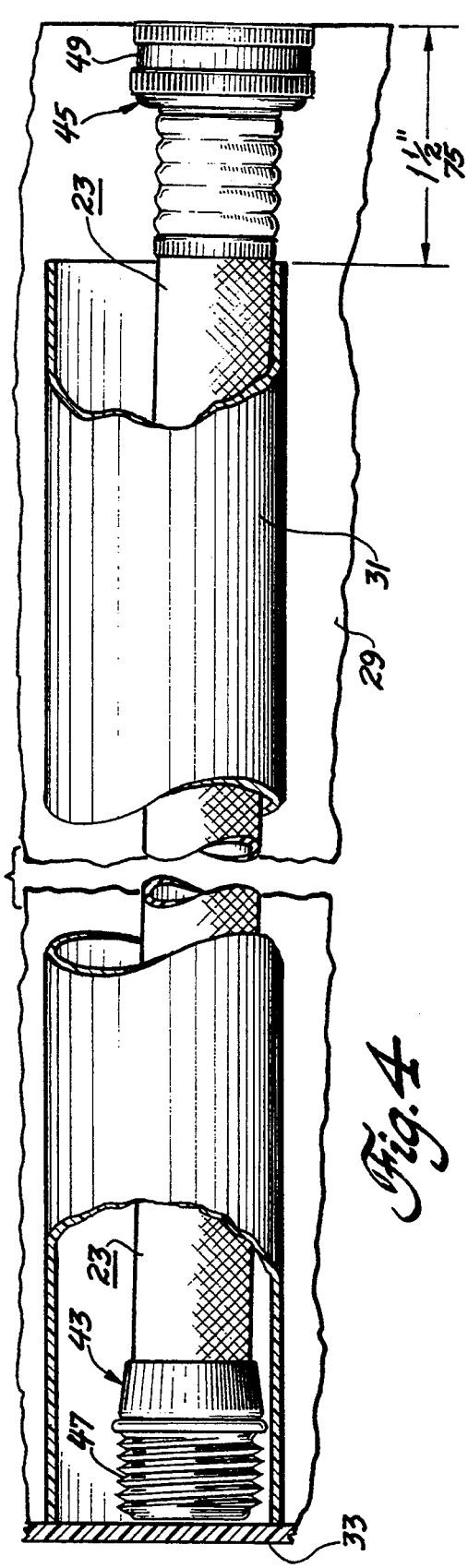
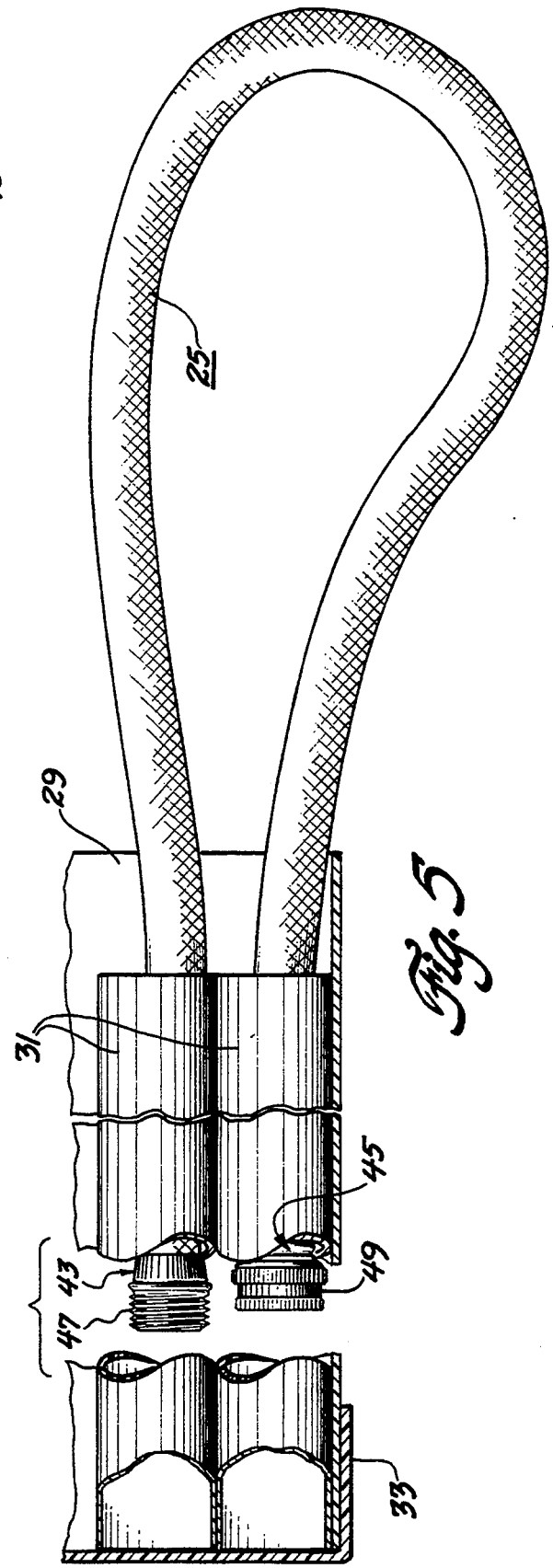

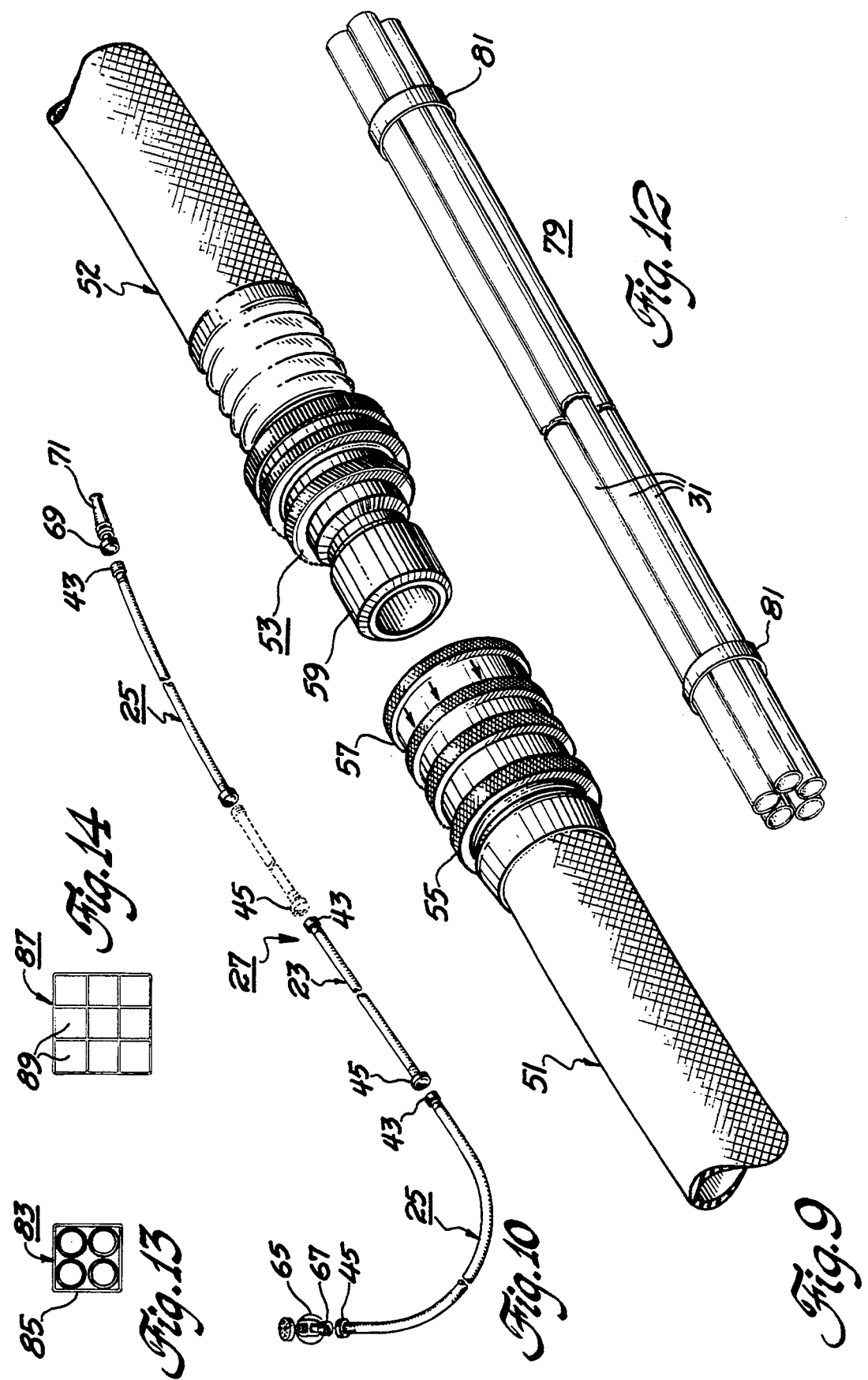

HOSE

BACKGROUND OF THE INVENTION

This invention relates to hoses such as garden hoses and it has particular relationship to the storing of such hoses available for use. While this application deals principally with the storing of garden hoses, it is understood that the adaptation of the principles of this invention to hoses of other types is within its scope of equivalents. Disclosure Document 331,336 which relates to this invention and is of record in the Patent and Trademark Office is incorporated herein by reference.

In accordance with teachings of the prior art, a hose of substantial length, for example, 50 feet, is provided as a single unit. To store such a hose after use, it is disconnected from the source of water and is coiled and the coil suspended. The hose offers resistance to the coiling so that the coiling is an awkward and tiring disagreeable task. The hose as coiled is relatively heavy, adding to the problem of storing. Sometimes the hose becomes dislodged from the mechanism on which it is suspended and a part falls on the ground adjacent to the suspension where it may be run over by a vehicle.

It is an object of this invention to overcome the above-described drawbacks and disadvantages of the prior art and to provide a hose of substantial length which shall lend itself to ready storage without demanding the coiling and its attendant problems. It is also an object of this invention to provide a method of storing a hose of substantial length without encountering the above-described drawbacks and disadvantages.

SUMMARY OF THE INVENTION

In accordance with this invention, there is provided a hose of substantial length which is formed of a plurality of sections, each section having couplers at its ends. The sections are so short as not to require or lend themselves to coiling and of such sufficient length that only a small number of sections are required when joined to form the hose of substantial length. The hose sections may be unfolded or folded into a U-configuration. For example, an unfolded hose section may be 10-feet long so that five sections may be joined to form a hose 50-feet in length. Or a folded section may be 20-feet in length so that one folded section and three unfolded sections or two folded sections and one unfolded section form a hose 50-feet in length.

For joining the sections into a hose of substantial length, each section has a female coupler or connector at one end and a male couple or connector at the opposite end. The mating couplers are advantageously threadless, quick-connect couplers which click into locking and sealing engagement when the male coupler is trust into the female coupler. Such couplers may be bought in most hardware stores and in nurseries and gardening supply stores. Typical couplers are made and sold by GARDENA, Kress & Gastner, GmbH, Postfach 2747 D 7900, Ulm, Germany; also GARDENA, Inc., 6031 Culligan Way, Minnetonka, Minn. Such couplers may also be secured from Gilmour Manufacturing Co. of Industrial Park, Somerset, Pa. 15501. The use of such couplers on the hose sections facilitate the formation of the hose of substantial length from the sections for use and its disassembly after use. There is also provided in accordance with this invention a container assembly in which the hose sections are stored when not in use. This assembly includes a plurality of hose-section tubes which are secured to means for holding them together as a rigid unit. The container assembly may include a cylinder to the inner walls of which the hose-section tubes are secured or the cylinder and tubes are formed as a unit by injection molding. Or the assembly may include a plurality or bundle of hose-section tubes held together as a rigid unit by bands or rings to the inner surface of which the hose-section tubes are secured. For storage, the hose sections are inserted in the hose-section tubes and the assembly containing the tube sections is suspended from a wall at an angle to drain water.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 1 is a view in side elevation of an embodiment of this invention, an assembly for storing hose-section tubes shown mounted on the wall of a structure, typically of a garage;

FIG. 2 is a view in end elevation taken in the direction II FIG. 1 with a part of a hose section broken;

FIG. 3 is a view in side elevation showing a hose-section tube of the embodiment shown in FIG. 1 with the wall partly broken away to show tube sections;

FIG. 4 is a view in side elevation showing a fragment of the assembly shown in FIG. 1 with walls broken away with an unfolded hose section in a hose-section tube;

FIG. 5 is a view in side elevation showing a fragment of the assembly shown in FIG. 1 with a longer hose section folded in U-configuration in hose-section tubing;

FIG. 6 is a fragmental view in isometric with part of the wall broken away showing the end of the hose-section storage assembly shown in FIG. 1;

FIG. 7 is a fragmental view in side elevation with part of the wall broken away showing the end of the hose-section storage assembly shown in FIG. 1;

FIG. 8 is a view in transverse section taken along line VIII—VIII of FIG. 7;

FIG. 9 is a view in isometric showing the manner in which hose sections having threadless, quick-connect couplers are Joined into a hose of substantial length in the practice this invention;

FIG. 10 is an exploded view in isometric showing the manner in which hose sections are joined to form a hose of substantial length in the practice of this invention;

FIG. 11 is a view in transverse section showing a modification of this invention;

FIG. 12 is a view in isometric showing a further modification of this invention;

FIG. 13 is a view in end elevation showing another modification of this invention; and FIG. 14 is a view in end elevation showing still another modification of this invention.

It is to be understood that the dimensions shown in FIGS. 2, 3 and 7 are included only for the purpose of aiding those skilled in the art to practice this invention and not with any intention of in any way restricting this invention.

DETAILED DESCRIPTION OF EMBODIMENTS AND OF THE PRACTICE OF THE METHOD OF THIS INVENTION

The apparatus shown in FIGS. 1 through 10 is an assembly 21 for storing hose sections 23 (FIGS. 2, 3, 4) and 25 (FIGS. 1, 5) of a hose 27 (FIG. 10) of substantial length formed of these hose sections. The assembly includes a circular cylinder 29 within which a plurality of hose-section tubes 31 are secured. When the hose 27 is not in use, the hose sections 23 and 25 are stored in the tubes 31. The cylinder 29 is open at one end and has a cap 33 (FIGS. 6, 7, 8) at the opposite end. The cap 33 has holes 35 and 36 in its base and side. The cylinder 29 is mounted by straps 37 on the wall 39 of a structure 41 such as a garage at an angle to the horizontal. When the hose sections 23 and 25 are stored in the corresponding tubes 31, any water in the hose sections drains through the holes 35 and 36. It is desirable that the cylinder 29 be mounted with its end cap 33 near a drain in the floor of the structure 41.

Each hose section 23 is unfolded and is provided at its ends with couplers, a male coupler 43 at one end and a female coupler 45 at the opposite end. Typically, the hose sections have an outside diameter of one-half or five-eighths inches.

FIGS. 4 and 5 show threaded couplers 43 and 45. The male coupler 43 has an external thread 47 which engages an internal thread (not shown) in the female coupler 45 of a contiguous tube section 23 and 25. The internal thread is carried by a ring 49 which is mounted rotatable so that the joint is made by turning the female coupler 45. The base section need not be turned. The joint has an internal washer (not shown) which suppresses leakage.

An advantageous embodiment of the invention is shown in FIG. 9. In this case, the hose sections 51 and 52 include the cooperative male and female couplers 59 and 55, respectively, of a threadless, quick-connect coupler unit. The female coupler 55 includes a slidable ring 57 which is retracted to release internal balls (not shown) permitting the insertion of the stud 59 of the male coupler 59. After the stud 59 is inserted, the balls are locked by return of ring 57 and the joint is locked. The female coupler 55 carries an O-ring (not shown) to seal the joint. The joint is made by thrusting the stud 59 into the female member with the ring 57 retracted. The hose sections 51 can be assembled into hose 27 in a short time. The threadless, quick-connect couplers may be secured from GARDENA or Gilmour as described above. The Gilmour coupler is sold under the identification 090C.

The hose sections 23 and 25 or 51 and 52 should be so short as not to require coiling and so long that a hose of substantial length can be formed in a relatively short time and with a minimum of effort. FIG. 4 shows a typical unfolded hose 23, approximately 10-feet in length. A typical folded hose 25 is 20-feet in length. The assembly 21 (FIG. 1) has five hose-section tubes. For a 50-foot hose, five 10-foot hoses 23, or three 10-foot hoses and one 20-foot hose 25 or one 10-foot hose and two 20-foot hoses could be stored in the assembly.

In the practice of this invention, a hose 27 can be assembled as shown in FIG. 10. A long section 25 may be connected to a spigot 65 through which water is delivered. The spigot has a male coupler 67 which is coupled to the female coupler 45 of the section 25. At its opposite end the hose 25 has a male coupler 43 which is connected to the female coupler 45 of the contiguous hose 23. The hose 23 has a male coupler at the opposite end which is connected to a female coupler 45 of the next hose, etc. The remote end section 25 has a male coupler 43 at its end and this coupler is connected to the female coupler 69 of a nozzle 71. Usually when there are two long hose sections 25 in the hose, there is only one short hose section 23, but any number of hose sections may be included to provide a hose of a desired length.

As shown in FIG. 4, the hose section 23 is 10-feet long, while the hose-section tube 31 is 9-feet, 10-½-inches long so that there is a space 72 of 1-½-inches at the end. This space serves to facilitate removal of the hose sections 23 from the tube 31.

The modifications of the invention shown in FIG. 11 is an assembly 73 including a cylinder 75 which accommodates seven hose-section tubes 77, six peripheral sections and one central section. Typically, this assembly stores the sections for a hose whose total length is 70-feet.

FIG. 12 shows an assembly 79 in which the hose-section tubes are joined by bands 81.

FIG. 13 shows an assembly 83 in which the cylinder 85 is of square cross-section.

FIG. 14 shows an assembly 87 in the form of an egg crate. This assembly provides nine compartments 89 for hose sections.

While preferred embodiments and preferred practice of this invention are disclosed herein, many modifications thereof are feasible. This invention is not to be restricted except insofar as is necessitated by the spirit of the appended claims.

I claim:

1. A container assembly for storing sections of a garden hose, each section having means at the ends thereof for coupling to contiguous sections to form said garden hose for use; said container comprising a plurality of hose section tubes, each tube dimensioned to contain a said section of said garden hose and means engaging said hose section tubes and securing them together as a rigid unit.

2. The container assembly of claim 1 wherein the engaging and securing means is a cylindrical member to the inner periphery of which the hose tubes are secured.

3. The container assembly of claim 2 wherein the cylindrical member is a cylinder of circular cross-section to the inner walls of which hose tubes are secured.

4. The container assembly of claim 1 wherein the cylindrical member is a cylinder of polygonal cross-section to the inner surface of the walls of which the hose tubes are secured.

5. The container assembly of claim 4 wherein the polygonal cross-section is a square cross-section.

6. The container assembly of claim 2 wherein each hose tube extends a short distance beyond the hose-section tube to be stored therein so that each hose section may be readily engaged for removal from or insertion in said hose-section tube.

7. The container assembly of claim 1 wherein the hose tubes are in a bundle and the engaging and securing means are a plurality of ring-shaped members of small width compared to the length of the bundle, engaging said bundle at spaced positions along the bundle length.

8. In combination with a garden hose of substantial length formed of a plurality of sections that are short compared to said substantial length and can be stored without being coiled, at least one of said sections being longer than others of said sections, a container having separate compartments for storing said sections, said other sections being stored each in a single compartment and said at-least-one of said sections being formed into a U-shape for storing with the arms of the U extending into adjacent compartments.

9. A container assembly for storing sections of a garden hose formed of a plurality of sections, each section being of a length adapting it to be stored manually without being coiled, each section having means at the ends thereof for coupling to contiguous sections to form said garden hose for use; said container comprising an elongated member having compartments therein, each compartment extending along the length of said elongated member and being open at least at one end to receive a hose section, said compartments being arrayed in rows and columns in a generally rectangular configuration.

* * * * *